United States Patent [19]

Tognazzini

[11] Patent Number: 6,118,401
[45] Date of Patent: *Sep. 12, 2000

[54] AIRCRAFT GROUND COLLISION AVOIDANCE SYSTEM AND METHOD

[75] Inventor: Bruce Tognazzini, Woodside, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,299

[22] Filed: Jul. 1, 1996

[51] Int. Cl.[7] .............................. G01S 13/93; G01S 13/86
[52] U.S. Cl. ................................. 342/29; 342/55
[58] Field of Search ................... 342/27, 28, 29, 342/41, 55

[56] References Cited

U.S. PATENT DOCUMENTS

| | | | |
|---|---|---|---|
| 3,872,474 | 3/1975 | Levine | 342/36 |
| 4,139,848 | 2/1979 | Maxwell et al. | 342/36 |
| 4,635,203 | 1/1987 | Merchant | 364/458 |
| 4,695,959 | 9/1987 | Lees et al. | 364/458 |
| 4,918,442 | 4/1990 | Bogart, Jr. | 340/961 |
| 5,581,250 | 12/1996 | Khvilivitzky | 340/961 |

FOREIGN PATENT DOCUMENTS 3805047  2/1988  Germany .

OTHER PUBLICATIONS

"Radar on a Chip 101 uses in your life," D. Stover, *Popular Science*, pp. 107–110, 116–117, Mar. 1995.

"Micropower Impulse Radar (MIR) Technology Overview", World Wide Web Site for Lawrence Livermore National Laboratories, Internet address of http://www–lasers.llnl.gov/lasers/idp/mir/overview.html, Jun. 14, 1996.

*Primary Examiner*—John B. Satomayor
*Attorney, Agent, or Firm*—McDermott, Will & Emery

[57] ABSTRACT

A system and method for avoiding collision between objects and wingtips of an aircraft when the aircraft is on the ground includes mounting detecting devices such as a low cost radar unit and a video camera in the wingtip. These detection devices are coupled with one or more indicators to provide an operator of the aircraft such as a pilot that an imminent collision with an object is about the occur. The indication can be an audio or visual signal, either within or outside of the aircraft.

18 Claims, 2 Drawing Sheets

AIRCRAFT GROUND COLLISION AVOIDANCE SYSTEM AND METHOD

BACKGROUND OF THE INVENTION

1. Field of the Invention

The present invention is directed to an aircraft ground collision avoidance system and method and, in particular, to a system and method which utilizes one or both of radar and video technology in an aircraft's wingtips to indicate the presence of an object so that collision with the object can be avoided.

2. Description of Related Art

A constant problem when an aircraft is moving on the ground, either taxiing on its own power or being pushed, is crashing one or more of the aircraft's wingtips into other aircraft and/or miscellaneous objects. In many instances, an aircraft must be moved down a corridor which provides only minimum clearance on either side of the aircraft's wingtips. In these instances, it is not unusual for the aircraft to go off course and strike an object with a wingtip. These collisions can cause extensive damage to the aircraft wingtip and be expensive to repair.

Aircraft collision avoidance systems have been used in the past to prevent airborne collisions. In one type of system, transponders in each aircraft reply to interrogations from secondary surveillance radars on the ground to monitor the positions of the aircraft in the sky. Another system uses interrogation between transponders of airborne aircraft. Both systems are designed to avoid airborne collisions.

Another system using radar has been proposed as a backup-warning system. In this system, a radar unit is mounted in the tail light, bumper or trunk lid of a vehicle. The warning system kicks in whenever you shift the vehicle into reverse. The system emits a tone that increases in pitch as you draw closer to a parked car or other object and starts beeping when you get within six inches. This system uses a micropower impulse radar unit which can fit on a 1.5 inch square circuit board. The unit transmits and receives radio waves up to 200 feet away.

This radar has range-gating capability. That is, the range-gating can be used to create a radar bubble around the radar device. For example, the range might be set to 20 feet. The radar gate then opens to emit only the reflections from objects at that distance. It detects motion by repeatedly checking the echo pattern to see whether it changes over time. A change means that the bubble has been penetrated by a moving object.

This type of radar is termed micropower impulse radar or MIR. The radar is described in an article entitled "Radar on a Chip 101 Uses in Your Life" in the March, 1995 issue of *Popular Science*. This publication is herein incorporated by reference and the radar unit is available commercially, e.g., Radio Shack retail stores.

The MIR is also discussed in an article at http:// www-lasers.llne.gov/lasers/idp/mir/overview.html, the website for Lawrence Livermore National Laboratories, which is hereby incorporated by reference.

While airborne collision avoidance systems have been proposed and backup warning systems using MIR radar have been proposed, there still exists a need to prevent damage to aircraft wingtips caused by colliding with other objects when the aircraft is being taxied or moved along the ground.

In response to this need, the present invention overcomes the problem of aircraft wingtip damage by providing a simple and reliable system and method to alert an aircraft operator of an imminent collision so that the collision can be avoided.

SUMMARY OF THE INVENTION

The present invention provides a method of avoiding collision between a wingtip of an aircraft when on the ground and an object by first detecting the presence of the object which is in proximity to at least one of the wingtips of the aircraft, the proximity of the object being such that the wingtip and object could collide based on movement of the aircraft. Indication is then made to an operator controlling the movement of the aircraft of the presence of the object so that operator can react to avoid collision between the object and at least one of the aircraft wingtips.

Preferably, the detecting step is performed using at least one of radar and a video camera. More preferably, both are used and the radar is a micropower impulse type radar.

Once the presence of an object is detected, indicating can be performed by one or more of an audio signal, a video image and a visual warning device. The audio signal can be either in the form of a tone or one or more voice commands. The audio signal could increase in pitch, intensity and/or frequency as the object nears the wingtip.

The object detection can be done for objects forward of the wingtip, full aft of the wingtip and to the sides thereof.

The detection step can be performed sequentially over a range extending from full aft past the midpoint of each wingtip and to full forward. The detecting step can also be responsive to steering of the aircraft so that a field a detection changes with respect to a change in direction of the movement of a given wingtip. The audio signal can be provided for each wingtip so that an operator knows, based on the location of the signal source, which wingtip is in danger of a collision. The signal may also emanate from either inside and/or outside of the aircraft so that an aircraft operator either in the cockpit or outside on a pushing or pulling vehicle will be alerted to the collision.

In the apparatus aspect of the invention, a system is provided for avoiding collision between an object and one of the wingtips of an aircraft when on the ground. The system includes a detecting device comprising at least one of a radar unit and a video camera, each being mountable to the wingtip of an aircraft for detection of the object. Also provided is an indicating device also mounted to the aircraft for indicating a presence of the object as detected by the detecting device so that an operator of the aircraft can react to avoid collision between the object and the aircraft wingtip.

When the detecting device is a radar unit, one or more of an audio signal device and a visual warning lamp can be provided to signal an imminent collision. When using an audio signal device, one device can be provided for each wingtip so that operator knows which wingtip is in jeopardy of collision.

The field of detection of the detecting device can be altered by including a drive to move the device so that the field of detection extends over a 270° arc. The detecting device, particularly the radar unit, detects an object at a set distance. The distance of detection can be altered by a control so that only objects within a certain distance will be detected for possible collision. The field of detection can also be altered based on movement of the aircraft, e.g., turning or the like.

Preferably, the radar of the detecting device is a micropower impulse type radar.

BRIEF DESCRIPTION OF DRAWINGS

Reference is now made to the drawings of the invention wherein.

DESCRIPTION OF THE PREFERRED EMBODIMENT

With the inventive method and system, the number of wingtip collisions and subsequent aircraft damage can be drastically reduced without the need for extensive and/or complicated systems which would require high levels of capital expenditure. According to the preferred mode of the invention, collision avoidance between the wingtips of an aircraft and an object when the aircraft is either taxiing on the ground or is being pushed/pulled by a vehicle can be avoided using micropower impulse radar, these units costing about $10.00 to manufacture. Thus, for a relatively small initial investment, thousands and thousands of dollars of damage to an expensive aircraft can be avoided.

Figure 1:
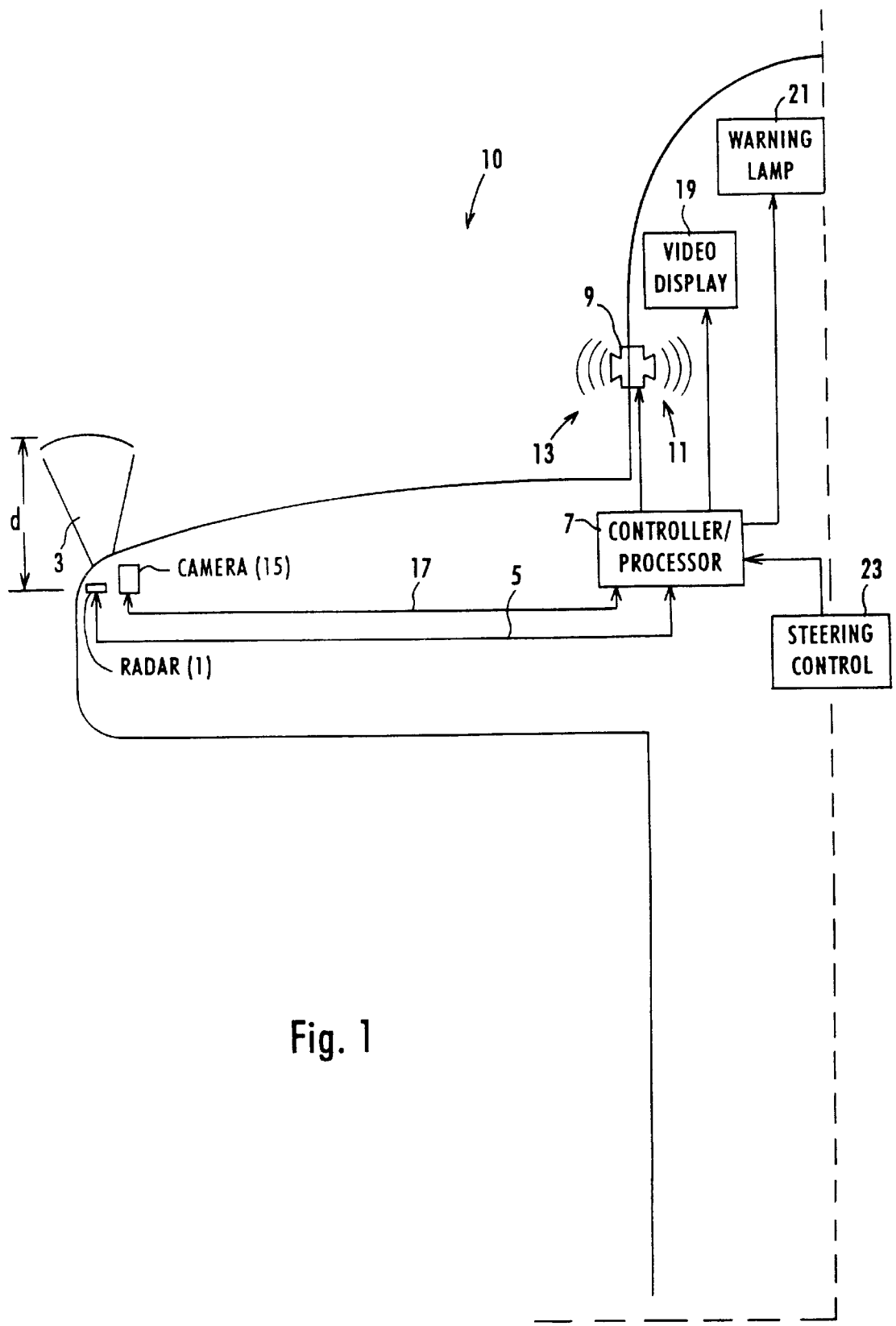
FIG. 1 is a schematic diagram of a first embodiment of the inventive system.

Referring now to FIG. 1, a schematic diagram of a first embodiment of the present invention is generally designated by the reference numeral 10. This diagram shows one-half of an aircraft for description purposes. However, it should be understood that the instant invention is applicable to the other wingtip not illustrated in FIG. 1.

In this broadest sense, the inventive system 10 includes a detecting device which is capable of detecting objects near the aircraft's wingtip and one or more indicators to alert an operator of the aircraft that a collision is imminent. The detection device is one that has the capability to detect an object which is in proximity to the aircraft wingtip when the aircraft is moving on the ground. Although any known detecting devices can be used in the inventive system, preferred devices include at least one of a radar unit 1 and a video camera 3. The radar unit 1, as is well known in the art, transmits electromagnetic energy and detects this energy reflected by objects in the radar's field of detection 3. When the radar detects an object in proximity to the aircraft's wingtip, it can then provide a signal 5 which can be used to provide an indication to the aircraft operator of imminent collision.

In a preferred mode of the invention, the radar 1 is a micropower impulse radar as described above and which has been incorporated by reference herein. This radar, besides being compact and inexpensive, also has a range-gating capability so that it can be controlled to detect objects at a given distance. This distance is identified as letter "d" in FIG. 1 in association with the detection field 3. This type of radar is particularly useful since it can be easily mounted on an aircraft wingtip and is low in cost.

The signal emanating from the radar 1 is fed to a controller/processor 7 which processes the signal so as to provide an indication of the imminent collision.

In one embodiment, indication to an aircraft operator can be in the form of an audio signal produced by an audio signaling device 9. The audio signaling device 9 can provide an audio signal 11 inside the aircraft and external audio signal 13 outside the aircraft of both. The audio signal 11 warns the pilot of the aircraft that an object is nearing the aircraft wingtip so that the pilot can react and avoid collision. The audio signal 13 can warn an operator on a pushing/pulling vehicle.

In a preferred mode, an audio signaling device 9 is provided for each wingtip so that an operator can distinguish which wingtip is in danger of collision. The audio signal 11 may be in the form of a tone or voice command such as "brake" or "turn right". The audio signal 11 can also vary depending on the proximity of the object nearing the wingtip. As the object nears, the audio signal could rise in volume, intensity and/or frequency.

The change in the audio signal can be tied to either the distance of the object from the wingtip or the time of impact. For example, if the object is 25 feet away, the tone may be minimal. However, as the wingtip nears the object, the tone could get audibly louder. Alternatively, the audio signal could be based on the time of impact or the movement of the wingtip. For example, if the plane is travelling at 15 mph, the time of impact for an object at 25 feet is much less than if the plane were travelling at one mph. Thus, the signal from the radar unit could be controlled and/or processed so that the rate of change of the distance between the wingtip and the object controls the change in the audio signal. Since the manner in which the audio signal can be controlled is not an aspect of the invention as and is well within the skill of the artisan, no further explanation of the details are necessary for the understanding of the invention.

Referring again to FIG. 1, the system for collision avoidance can also include a video camera 15 to visually detect the presence of an object in the vicinity of the wingtip. The video camera 15 can be any known type of a camera which will detect the object image and transmit the image signal 17 to the controller/processor 7 for display on the video display 19. Video display 19 can be a split screen display to show the camera view from each wingtip. Alternatively, a pair of video displays can be mounted in the cockpit area for viewing by the pilot.

The particular image processing needed to convert the detected image supplied by the video camera 15 into an image for the display 19 is well known in the art. Thus, a description thereof is not deemed necessary for understanding of the invention.

A warning lamp 21 may also be provided to signal an operator of the aircraft that a collision with an object is imminent. The warning lamp can increase in intensity or flash in an increasing frequency to indicate that the object is nearing the wingtip. The warning lamp 21 could also flash a command such as a brake, turn right or turn left so that the operator of the aircraft can react to avoid collision with a detected object.

As stated above, the radar unit 1, particularly the micropower impulse type radar, can be set to look for objects at a certain range. For example, the micropower impulse radar unit could be set to scan no more than six inches out to the side of the unit while scanning a full 15 feet in front. This range can be altered when the aircraft is in a turning mode. In this embodiment, the controller/processor 7 would receive information from the steering control 23 of the aircraft so as to change the range of the radar unit 1. For example, if the aircraft is turning right such that the left wing would be moving both at a higher velocity and a different direction than the right wing tip, the radar unit 1 range could be enlarged to account for the increase in wingtip velocity to provide a quicker indication of the presence of an object. For example, if the radar unit was set to detect objects at 20 feet, onset of a right turn by the aircraft could cause the controller/processor 7 to change the radar unit range from 20 feet to 50 feet. Thus, even if the wingtip is moving at an increased velocity because of the aircraft turn, an object 50 feet away will be detected and adequate time will be given to avoid collision.

Figure 2:
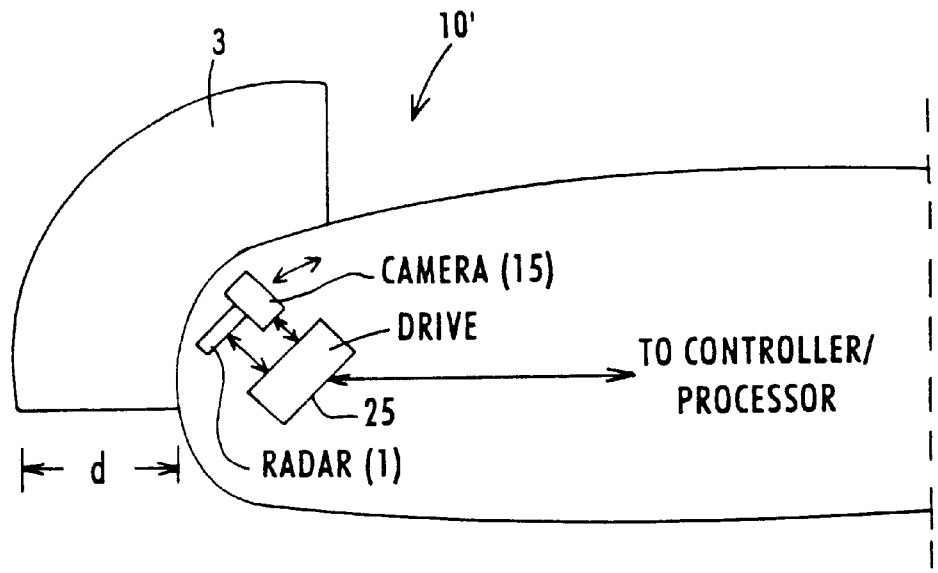
FIG. 2 is a schematic diagram of a second embodiment of the inventive system.

Referring to FIG. 2, an alternative embodiment of the inventive system is generally designated by the reference numeral 10'. In this embodiment, a drive 25 is used to make a horizontal sweep of the space roughly from the midline of the wing to full forward. With the drive, the effective width of the radar beam can be increased by controlling the amount of the sweep. In FIG. 2, an exemplary 90° sweep is illustrated. However, it is possible that the sweep could be increased so that the detection device searches for objects both full forward, at the midpoint of the wing and full aft. These sweeps could extend up to 270° to provide as complete as coverage as possible to avoid wingtip collision with an object. The cycle of the sweep should take into account the speed of the wingtip. That is, the sweep cycle should be of a sufficiently short period of time that objects appearing in the full forward direction would not appear and be struck by the wingtip before the drive cycles back to full forward from another position such as full aft.

Figure 3:
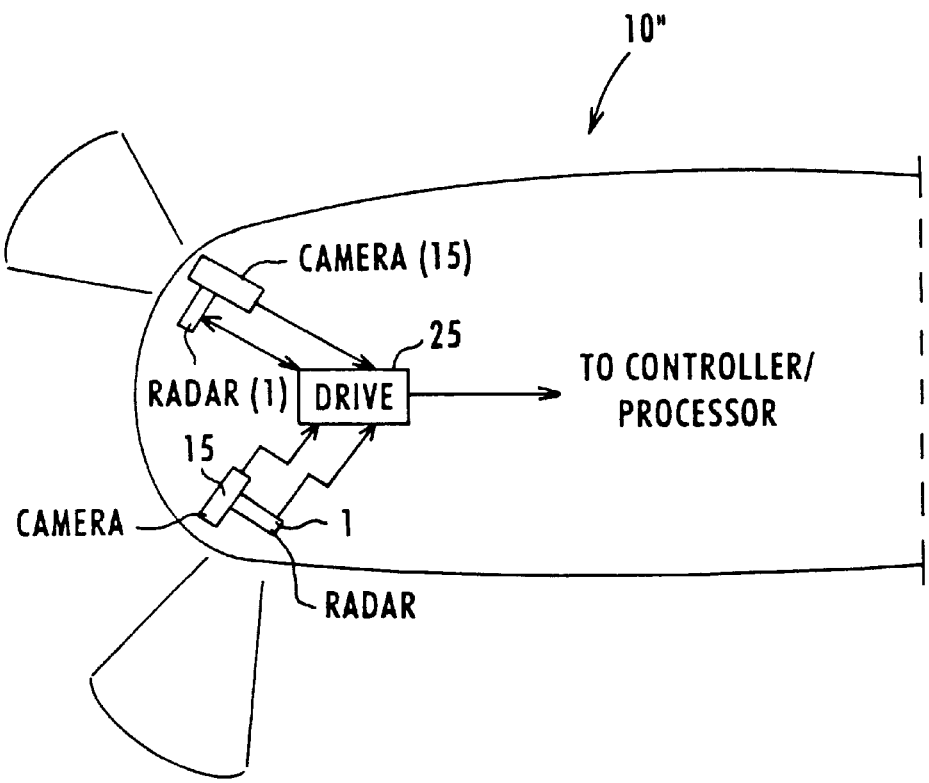
FIG. 3 is a schematic diagram of a third embodiment of the inventive system.

To facilitate a more complete collision avoidance, a pair of detection devices could be mounted so that both forward and aft spaces can be monitored for the presence of an object so as to avoid collision therewith, see FIG. 3. In this embodiment designated as 10", the forward and aft devices can be controlled by the drive 25. Alternatively, while not shown, the detecting devices could be stationarily mounted as shown in FIG. 1 or be driven by a pair of drives.

The curve 25 can also be linked to the steering control 23 via the controller/processor 7 so that the field of detection for the radar and/or video camera is in the proper position when the aircraft is turning. With reference again to FIG. 2, the drive 25 could manipulate the field of detection 3 in a more full forward direction to avoid collision with objects which would not be struck if the aircraft were travelling in a straight line but would collide with the wingtip during an aircraft turning period.

The mounting of either the radar 1 or camera 15 can be done as is known in the art. Likewise, the controller/processor can be located in any appropriate site for operating the collision avoidance system.

In the instance where there are cameras are both forward and aft, the image on the video display could be selected depending on the movement of the aircraft. That is, if the aircraft is moving forward, the forward video cameras would have their image displayed on the video display 19. If the aircraft were being pushed backwards, the image detected by the aft cameras would be shown on the video display 19.

Although any drive mechanism could be used to manipulate either the radar and/or video camera, a stepper motor would be a preferred device.

In the method aspect of the invention, the detecting devices located on each wingtip of the aircraft provide an indication to either a pilot in the aircraft or the operator of a vehicle or the like moving the aircraft that a collision is imminent. The indication can be either in the form of a video image, audio signal or warning light or lamp. Based on the indication, the operator or pilot can than react by either stopping the plane or changing the plane's course on the ground. It should be understood that the inventive method is directed to avoiding collision while the plane is taxiing or being pushed on the ground, i.e., non-airborne collisions. As described above, the indication to the operator can be a signal for each wingtip, the signal varying to indicate that the object is becoming closer to the wingtip. The signal can vary in any number of ways, either by tone, frequency and/or intensity if an audio signal or by flashing, color change and/or frequency change if a visual signal. In either case, the operator is duly warned that a collision is imminent so that the operator can take the necessary actions to avoid wingtip damage.

As such, an invention has been disclosed in terms of preferred embodiments thereof which fulfills each and every one of the objects of the present invention as set forth hereinabove and provides a new and improved method and system for avoiding collisions between an aircraft wingtip's when the aircraft is moving on the ground.

Of course, various changes, modifications and alterations from the teachings of the present invention may be contemplated by those skilled in the art without departing from the intended spirit and scope thereof. Accordingly, it is intended that the present invention only be limited by the terms of the appended claims.

I claim:

1. A method of avoiding collision between a wingtip of an aircraft on the ground and an object comprising the steps of:
    (a) detecting the presence of a nearby object which is in proximity to one of the wingtips of an aircraft when the aircraft is on the ground using a radar and at least one video camera, the proximity of the object capable of causing the wingtip and object to collide based on movement of the aircraft; and
    (b) indicating the presence of the nearby object and the wingtip to which it is proximate to an operator controlling the movement of the aircraft so that the operator can react to avoid collision between the wingtip and the nearby object.

2. The method of claim 1 wherein said the radar is a micropower impulse type radar.

3. The method of claim 1 wherein said indicating step provides at least one of an audio signal, a video image and a visual warning.

4. The method of claim 1 wherein said detecting step detects objects which are at least one of full forward, full aft and to a side of each of the wingtips.

5. The method of claim 1 wherein said detecting step sequentially detects objects from a midpoint of each wingtip to one of full forward and full aft.

6. The method of claim 1 wherein said detecting step is responsive to steering of said aircraft so that a field of detection of said detecting step is varied with respect to a change in direction of movement of a respective said wingtip.

7. The method of claim 3 wherein said audio signal is provided both inside and outside of said aircraft.

8. A system for avoiding collision between an object and wingtips of an aircraft on the ground comprising:
    (a) a detecting device comprising a radar unit and a video camera mountable to a respective wingtip of an aircraft for detection of an object near that wingtip; and
    (b) an indicating device mountable to said aircraft for indicating the presence of said object and the wingtip proximate to said object is detected by at least one of said radar unit and said video camera so that an operator of said aircraft can react to avoid collision between said object and said wingtip.

9. The system of claim 8 wherein said indicating device is at least one of an audio signal device, a visual warning lamp and a video display.

10. The system of claim 8 wherein said indicating device is an audio signal device and an audio signal device is provided for each wingtip.

11. The system of claim 8 wherein said detecting device has a field of detection for said object and said system includes a drive to move said field of detection up to 270°.

12. The system of claim 8 wherein said detecting device has a field of detection defining a distance between the detected object and the wingtip and said system includes a control to alter said field of detection to vary the distance of detection.

13. The system of claim 8 wherein said detecting device has a field of detection defining a distance for detecting the object and said system includes a control to alter said distance based on movement of said aircraft.

14. The system of claim 13 wherein said control increases said distance for one wingtip that moves faster than the other wingtip as a result of turning of said aircraft.

15. The system of claim 8 wherein said detecting device comprises a radar unit and video camera for each wingtip and an audio signal device and video display for each respective said radar unit and said video camera.

16. The system of claim 15 wherein each said audio signal device has capability for producing an audio signal inside and outside of said aircraft.

17. The system of claim 8 wherein said detecting device is a micropower impulse type radar.

18. An apparatus for avoiding collision between a wingtip of an aircraft on the ground and an object comprising:

a detector for detecting the presence of a nearby object which is in proximity to an aircraft when the aircraft is on the ground, the field of view of said detector changing with a change of direction of the aircraft; and an indicator indicating the presence of the nearby object and the wingtip to which it is proximate to an operator controlling the movement of the aircraft so that the operator can react to avoid collision between the wingtip and the nearby object.

* * * * *